United States Patent Office 3,356,679
Patented Dec. 5, 1967

3,356,679
PROCESS FOR THE PRODUCTION OF MONOCHLOROPYRAZINE
Godfrey Fort, Ardrossan, Scotland, assignor, by mesne assignments, to the United States of America as represented by the Secretary of the Navy
No Drawing. Filed Nov. 28, 1966, Ser. No. 597,209
Claims priority, application Great Britain, Dec. 14, 1965, 53,118/65
5 Claims. (Cl. 260—250)

ABSTRACT OF THE DISCLOSURE

There is provided a process for the preparation of monochloropyrazine comprising heating 2,3,5,6-tetrachloro-1,4-diformylpiperazine to a temperature within the molten range thereof, which heating effects a decomposition of the heated material and forms the monochloropyrazine.

---

This invention relates to a process for preparing monochloropyrazine, a compound which is a valuable intermediate in the production of compounds such as, for example, sulphapyrazine, which have pharmaceutical uses.

In accordance with the invention monochloropyrazine is prepared by heating 2,3,5,6-tetrachloro-1,4-diformylpiperazine to effect decomposition thereof. 2,3,5,6-tetrachloro-1,4-diformylpiperazine may be readily prepared in two stages from glyoxal and formamide as described in our co-pending United Kingdom Application No. 32,124/64. The invention thus provides a three-stage route to monochloropyrazine from cheap starting materials. The complete process may be represented in the following manner:

Stage 1

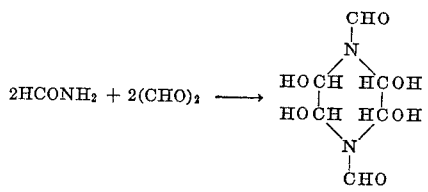

Stage 2

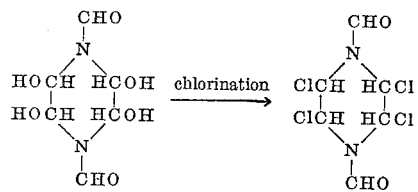

Stage 3

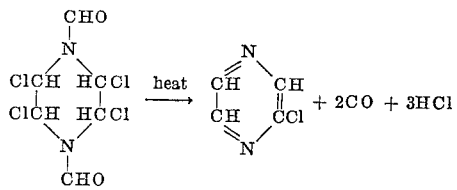

We have found that a convenient temperature range for carrying out the decomposition is 185 to 200° C. which is just above the melting point of 2,3,5,6-tetrachloro-1,4-diformylpiperazine. Although stage 3 is represented above as leading directly to monochloropyrazine in the form of the free base, usually the monochloropyrazine is produced initially as the monohydrochloride salt. Since monochloropyrazine is only weakly basic, the free base is readily obtained from the hydrochloride by treatment with water and separation of a non-aqueous phase which consists essentially of monochloropyrazine. To ensure complete conversion to the free base, it is preferred to treat the hydrochloride with water and an alkaline neutralising agent such as sodium hydroxide. Isolation of the free base is conveniently effected by extraction with ether subsequent to neutralisation.

In a preferred method of putting the invention into practice, 2,3,5,6 - tetrachloro - 1,4 - diformylpiperazine is heated in a controlled manner until it melts and gas is evolved from the molten phase. The evolved gaseous products are led through a condensing system maintained at such a temperature that monochloropyrazine hydrochloride is retained and hydrogen chloride and carbon monoxide pass through. The condensing surface may conveniently be cooled by air or by a water jacket. When the heating process is suitably controlled 2,3,5,6-tetrachloro-1,4-diformylpiperazine is converted, without appreciable residue, mainly to carbon monoxide, hydrogen chloride and monochloropyrazine hydrochloride which collects in the condenser as a solid sublimate.

The invention is further illustrated by the following example in which all parts and percentages are by weight.

EXAMPLE 16.476 parts of 2,3,5,6-tetrachloro-1,4-diformylpiperazine were placed in a round-bottomed flask and the neck of the flask was loosely plugged with glass wool to prevent entrainment of undecomposed starting material. A long glass tubular condenser was attached to the flask by a ground glass joint. The flask was heated by a flame until the solid became molten and evolution of gas began and thereafter sufficient heat was applied to maintain a convenient reaction rate. A sample of the gas issuing from the condenser was passed through a tube packed with soda-lime and it was shown by infra-red spectroscopy to be pure carbon monoxide. Heating was continued until no more liquid remained in the flask. A hygroscopic, white sublimate collected in the condenser and was found to contain: C, 30.3%; H, 2.4%; total Cl, 44.6%; Cl⁻, 22.5%; N, 17.5%. Monochloropyrazine hydrochloride ($C_4H_4Cl_2N_2$) contains: C, 31.8%; H, 2.65%; total Cl 47.0%; Cl⁻, 23.5%; N, 18.55%. The tube was detached from the flask and the solid sublimate washed out with 30 parts of cold water. The aqueous solution, which contained a lower oily layer, was made slightly alkaline by addition of 20% sodium hydroxide solution and was then shaken with 14 parts of ether. After separating off the ether layer the extraction was repeated using another 14 parts of ether. The combined ether extracts were dried over anhydrous sodium sulphate and the ether distilled off at atmospheric pressure. The residual liquid (4.337 parts) was distilled at atmospheric pressure using a simple distillation flask, without a fractionating column, heated in a bath at 172–175° C. The main fraction (3.594 parts) had a boiling point of 152° C. which agreed with a boiling point of 150–153° C. for monochloropyrazine disclosed in British Patent 613,109. The yield of distilled monochloropyrazine (boiling point 152° C.) was 53% of the theoretical yield based on 2,3,5,6-tetrachloro-1,4-diformylpiperazine. The distilled product was found to contain: C, 42.0%; H, 2.60%; Cl, 31.7%; N, 23.6%. Monochloropyrazine ($C_4H_3ClN_2$) contains: C, 41.9%; H, 2.62%; Cl, 31.0%; N, 24.5%. The refractive index, $n_D^{20}$, was 1.536. This agreed with a value for $n_D^{25}$ of 1.5340 published by Klein and Spoerri, J. Am. Chem. Soc., 1951, 73, 2949–51. The distilled product (boiling point 152° C.) was examined by gas-liquid chromatography and shown to contain only one component. Hydrolysis with aqueous sodium hydroxide by the method described by Erickson and Spoerri, J. Am. Chem. Soc., 1946, 68, p.

400 gave a solid product melting at 187–188° C. Monohydroxypiperazine, $C_4H_4N_2O$, melts at 187–188° C.

What I claim is:

1. A process for the preparation of monochloropyrazine comprising heating 2,3,5,6-tetrachloro-1,4-diformylpiperazine to a temperature within the molten range thereof to effect decomposition thereof.

2. A process as claimed in claim 1 wherein the reaction temperature is in the range 185 to 200° C.

3. A process as claimed in claim 1 comprising the steps of decomposing 2,3,5,6-tetrachloro-1,4-diformylpiperazine to form monochloropyrazine monohydrochloride and converting the monohydrochloride to monochloropyrazine by treatment with water or alkali.

4. A process as claimed in claim 1 wherein 2,3,5,6-tetrachloro-1,4-diformylpiperazine is heated until it melts and gases are evolved from the molten phase and monochloropyrazine hydrochloride is condensed from the evolved gases.

5. A process for the preparation of monochloropyrazine which comprises reacting glyoxal with formamide to form 2,3,5,6-tetrahydroxy-1,4-diformylpiperazine, chlorinating the 2,3,5,6-tetrahydroxy-1,4-diformylpiperazine to form 2,3,5,6-tetrachloro-1,4-diformylpiperazine and decomposing the 2,3,5,6-tetrachloro-1,4-diformylpiperazine by heating to a temperature within the molten range thereof.

References Cited

UNITED STATES PATENTS

| | | | |
|---|---|---|---|
| 2,797,219 | 6/1957 | Taft | 260—250 |
| 3,287,451 | 11/1966 | Carrara et al. | 260—250 |

NICHOLAS S. RIZZO, *Primary Examiner.*